(12) United States Patent
Strijker

(10) Patent No.: US 7,675,280 B2
(45) Date of Patent: Mar. 9, 2010

(54) POWER FACTOR CORRECTION BOOST CIRCUIT

(75) Inventor: Joan Wichard Strijker, Wijchen (NL)

(73) Assignee: NXP B.V., Eindhoven (NL)

( * ) Notice: Subject to any disclaimer, the term of this patent is extended or adjusted under 35 U.S.C. 154(b) by 204 days.

(21) Appl. No.: 12/091,074

(22) PCT Filed: Oct. 18, 2006

(86) PCT No.: PCT/IB2006/053846

§ 371 (c)(1),
(2), (4) Date: Apr. 22, 2008

(87) PCT Pub. No.: WO2007/049194

PCT Pub. Date: May 3, 2007

(65) Prior Publication Data

US 2008/0278982 A1  Nov. 13, 2008

(30) Foreign Application Priority Data

Oct. 28, 2005 (EP) .................................. 05110158

(51) Int. Cl.
G05F 1/575 (2006.01)
G05F 1/613 (2006.01)

(52) U.S. Cl. ..................... 323/285; 323/222; 323/299

(58) Field of Classification Search ........... 323/205, 323/207, 222, 223, 282, 284, 285, 299
See application file for complete search history.

(56) References Cited

U.S. PATENT DOCUMENTS

| | | | |
|---|---|---|---|
| 6,469,917 B1 * | 10/2002 | Ben-Yaakov | 363/44 |
| 6,984,963 B2 * | 1/2006 | Pidutti et al. | 323/207 |
| 7,006,367 B2 * | 2/2006 | Clavel | 363/89 |
| 7,239,120 B2 * | 7/2007 | Adragna et al. | 323/285 |

FOREIGN PATENT DOCUMENTS

EP  1650857 A2  4/2006

OTHER PUBLICATIONS

St Microelectronics "L6563—Advanced Transition-Mode PFC Controller" St Microelectronics Datasheet, Nov. 13, 2004, pp. 1-37 Downloaded From: http://www.st.com/stonline/products/literature/ds/10967.pdf.

* cited by examiner

Primary Examiner—Gary L Laxton

(57) ABSTRACT

The invention relates to a power factor controller for use in a power factor correction circuit. The power factor controller comprises a first input (VinSense) for receiving an input voltage (Vin) of the power factor correction circuit, a second input (VoSense) for receiving an output voltage (Vout) of the power factor correction circuit, and a controllable current source (VCCI) having a control input coupled to the first input, and a current supply output coupled to the second input, wherein said controllable current source (VCCI) sources a current to the second input (VoSense) that is inversely proportional to the input voltage.

2 Claims, 1 Drawing Sheet

POWER FACTOR CORRECTION BOOST CIRCUIT

The invention relates to power factor correction.

To reduce mains harmonics in mains operated appliances Power Factor Correction (PFC) circuits are used. In many cases the PFC circuit is a switched mode power supply boost converter. This circuit draws a more or less sinusoidal current from the mains (Vac) and outputs a voltage that is typically higher than the rectified mains voltage. To optimize the efficiency of the PFC circuit, the output voltage can be made dependent on the input voltage; at a low input voltage the output voltage is low, at a high input voltage the output voltage is high. This is called a follow boost PFC circuit.

The STMicroelectronics datasheet L6563 describes a PFC controller. See FIGS. 39 and 40 in that datasheet for an application of the L6563. The input voltage is measured via a first resistive divider and the output voltage is modulated with this input voltage. The output voltage is measured via a second resistive divider. To modulate the output voltage, a current is drawn by a voltage controlled current source from the pin that measures the output voltage. At a low input voltage a low current is drawn, while at a high input voltage a higher current is drawn.

It is, inter alia, an object of the invention to provide an improved power factor correction circuit. The invention is defined in the independent claims. Advantageous embodiments are defined in the dependent claims.

A first aspect of the invention relates to a power factor controller for use in a power factor correction circuit. The power factor controller comprises a first input for receiving an input voltage of the power factor correction circuit, a second input for receiving an output voltage of the power factor correction circuit, and a controllable current source having a control input coupled to the first input, and a current supply output coupled to the second input, wherein said controllable current source sources a current to the second input that is inversely proportional to the input voltage.

These and other aspects of the invention will be apparent from and elucidated with reference to the embodiments described hereinafter.

Figure 1:
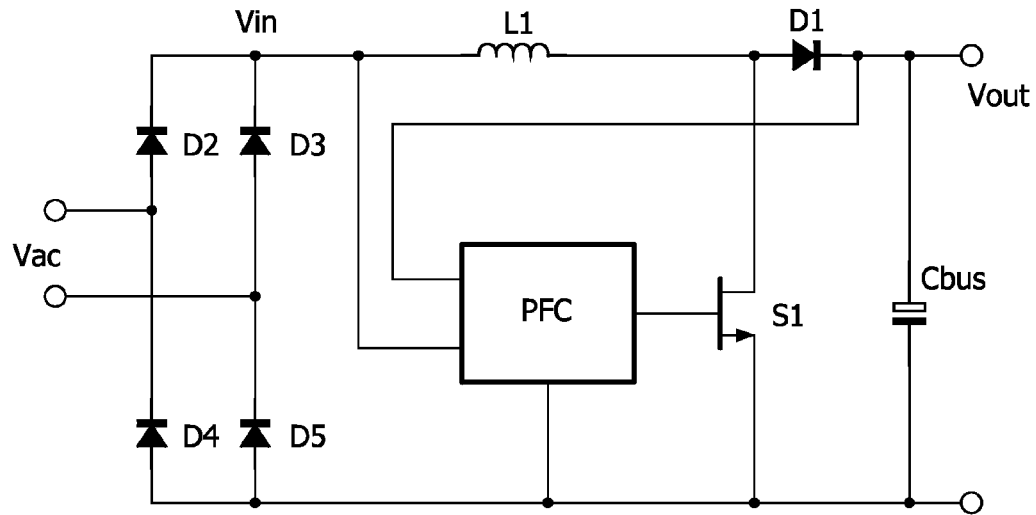
FIG. 1 shows a power factor correction circuit.

In the power factor correction circuit of FIG. 1, an input voltage Vac is rectified by means of a diode bridge D1, D2, D3, D4. The rectified input voltage Vin is applied to an input of a power factor controller. The power factor controller controls a switch S1 (usually a field effect transistor). A coil L1 (which may alternatively be a winding of a transformer) is connected between the input voltage terminal Vin and the drain of the field effect transistor S1. A diode D1 is connected between the drain of the field effect transistor D1 and an output voltage terminal Vout. An output voltage sense input of the power factor controller is connected to the output voltage terminal Vout. An output capacitor Cbus is connected between the output voltage terminals.

Figure 2:
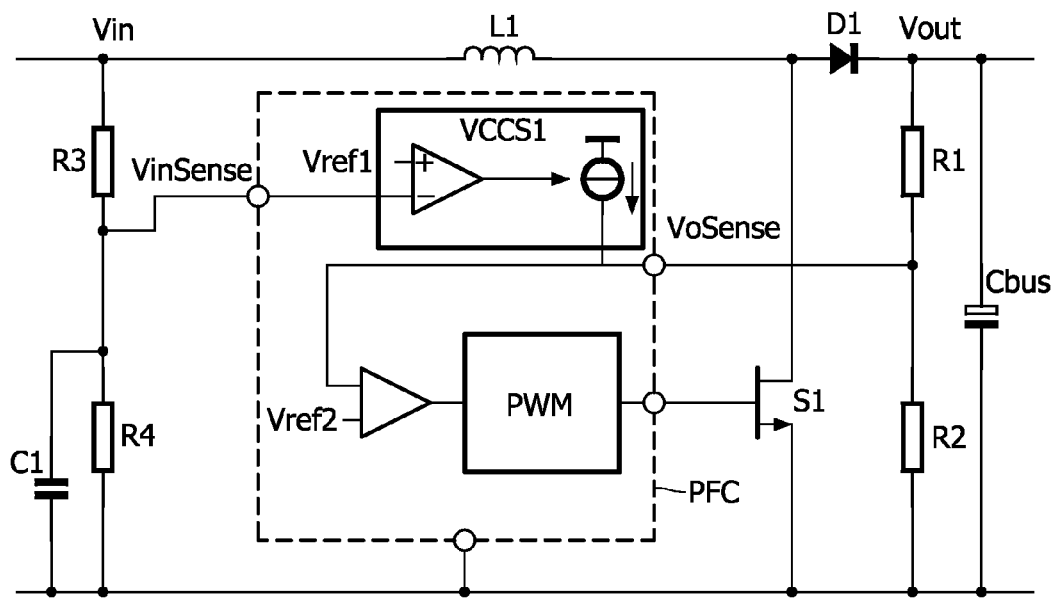
FIG. 2 illustrates an embodiment of a power factor correction circuit in accordance with the present invention.

In the embodiment of FIG. 2, the input voltage Vin is measured via a first resistive divider formed by resistors R3 and R4, and the output voltage Vout is modulated with this input voltage Vin. The output voltage Vout is measured via a second resistive divider formed by resistors R1 and R2, the tap between these two resistors R1 and R2 being connected to an input VoSense of the PFC control IC. In contrast with the prior art, to modulate the output voltage Vout, a voltage controlled current source VCCS1 sources a current to (instead of draws a current from, as in the prior art) the pin VoSense that measures the output voltage. At a high input voltage a low current is sourced, while at a low input voltage a higher current is sourced. The output voltage Vout is equal to Vout=Vref2*(R1+R2)/R2+(VinSense−Vref1)*gm1*R1, in which gm1 is the transconductance of the voltage controlled current source VCC12, and VinSense is the filtered voltage Vin*R4/(R3+R4). The filtering is done by a capacitor C1 in parallel with the resistor R4 in order to obtain a sinusoidal input current.

The invention is based on the recognition that in the prior art circuit shown in FIG. 40 of the STMicroelectronics L6563 datasheet, the influence of the inevitable inaccuracy of the voltage controlled current source is the largest at a high input voltage, and thus a high output voltage. The inaccuracy at a high output voltage will call for an output capacitor that has a higher voltage rating. As this capacitor is typically an expensive component in the whole PFC circuit, this higher rating will make the PFC circuit more expensive and bigger as for a higher voltage rating a larger capacitor has be used.

In accordance with the present invention, to overcome the inaccuracy at high input voltages caused by the factor (VinSense−Vref1)*gm*R1, one can make this factor (close to) zero at high input voltages. Therefore the voltage controlled current source VCC1 is inverted with respect to the prior art voltage controlled current source shown in FIG. 40 of the L6563 datasheet. Also, in the invention, at a high input voltage a low current is sourced, while at a low input voltage a higher current is sourced. For high input voltages the effect of the inaccuracy of the voltage controlled current source can be zero as the output current is zero at that moment. The effect of the inaccuracy of the voltage controlled current source VCCS1 is the largest at low input voltages. This however will hardly or not at all change the cost of the total power supply. Typically the PFC circuit is powering a second converter, as shown in FIG. 4 of the prior art STMicroelectronics L6563 datasheet. This second converter will not be more expensive if the lowest input voltage is less accurate. At high input voltages the output voltage Vout=Vref2*(R1+R2)/R2 when VinSense=Vref1. As the output voltage is only dependent on Vref2, which can typically be realized with an accuracy of within 1%, and resistors R1 and R2, the output voltage can be very accurate. So, in an implementation example where the minimum required output voltage at high mains voltages is 400V, as shown in FIG. 47 of the prior art STMicroelectronics datasheet L6563, in accordance with the present invention a capacitor that is good up till 420V leaves enough safety margin, so that it is not necessary to use a more expensive capacitor that is good up till 450V. Another advantage that may be obtained in some implementations of the invention follows from the fact that in view of the electrolytes used, a capacitor that is good up till 420 V has a higher quality than a capacitor that is good up till 450 V.

It should be noted that the above-mentioned embodiments illustrate rather than limit the invention, and that those skilled in the art will be able to design many alternative embodiments without departing from the scope of the appended claims. The notion "inversely proportional" does not necessarily require a straight-line relationship; what suffices is that at a high input voltage a low current is sourced, while at a low input voltage a higher current is sourced. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention claimed is:

1. A power factor controller for use in a power factor correction circuit, the power factor controller comprising:
   a first input for receiving an input voltage of the power factor correction circuit;
   a second input for receiving an output voltage of the power factor correction circuit;
   a controllable current source having a control input coupled to said first input, and a current supply output coupled to said second input, wherein said controllable current source sources a current to the second input that is inversely proportional to said input voltage, and
   an output for supplying a control signal.

2. A power factor correction circuit, comprising:
   a rectifier for rectifying an alternating input voltage to obtain a rectified input voltage;
   an inductive element in series with a controllable switch coupled between input voltage terminals;
   an output capacitor coupled between output terminals of said power factor correction circuit; and
   a power factor controller as claimed in claim 1 to control said controllable switch.

* * * * *